July 7, 1953

R. C. McLEOD ET AL 2,644,298

PROPULSIVE THRUST AUGMENTER

Filed Nov. 13, 1945

July 7, 1953 R. C. McLEOD ET AL 2,644,298
PROPULSIVE THRUST AUGMENTER
Filed Nov. 13, 1945 3 Sheets-Sheet 3

Inventors
Kenneth Watson
Roderick Cristall McLeod
by Stevens and Davis
their attorneys Patented July 7, 1953

2,644,298

UNITED STATES PATENT OFFICE 2,644,298

PROPULSIVE THRUST AUGMENTER

Roderick Cristall McLeod, Cropston, Leicester, England, and Kenneth Watson, Clarkston, Scotland, assignors to Power Jets (Research & Development) Limited, London, England Application November 13, 1945, Serial No. 628,294
In Great Britain March 15, 1943

Section 1, Public Law 690, August 8, 1946
Patent expires March 15, 1963

8 Claims. (Cl. 60—35.6)

This invention relates to systems for developing propulsive thrust by the reaction of a flow of energised fluid, commonly known as jet propulsion systems. The invention is concerned especially, though not exclusively, with such systems in which the source of motive fluid is a combustion gas turbine prime mover.

It is known that in certain circumstances it is of advantage to supplement the flow of motive fluid in order to increase the effective total momentum of fluid discharged in unit time and so to obtain greater thrust. This is notably the case in relation to aircraft propulsion if the system is required to afford great thrust at comparatively low forward speed, i. e. speed relative to the ambient fluid in which the system is operative, for example at take-off. A device for this purpose can for convenience be called a thrust augmenter, and it is an object of the present invention to provide an improved device of that character.

Thrust augmenters have been previously proposed and constitute the kind to which this invention relates, in which a rotor which is mechanically free, carries a turbine blading system to be operated upon by energised gas and a compressor or impeller blading system to operate on a second stream of gas, in this case air, the turbine blading receiving energy from the energised gas, and transmitting energy mechanically to the impeller blading, which retransmits it to the air engaged thereby, the rotor system being thus in effect self-driving and fundamentally without either input or output of shaft power. These augmenters as previously proposed were intended to be associated with a gas turbine jet-propulsion power unit, the exhaust stream from which constituted the working gas driving the augmenter. With the usual arrangement of gas turbine i. e. one with an annular exhaust duct, it was proposed to make the augmenter turbine blading operate in an inner continuously annular gas duct, whilst the impeller blading was arranged radially outside the turbine blading, to work in an outer concentric annular air duct. Such an arrangement can offer considerable difficulties of mounting, for an upstream augmenter mounting such as may be highly desirable, presents a very awkward problem if it has to be enshrouded by two concentric annular ducts the inner of which runs at high temperature. The relationship of the blade systems has therefore a practical connection, in the mind of the designer, with the method of mounting.

The present invention relates to a thrust augmenter of the above indicated character and has for its objects improvements in arrangement and construction in various directions. One advantage sought is in the arrangement of blading of the rotor system whereby turbine blades which run in a hot condition are relieved of loads whilst impeller blades which run comparatively cold are the more heavily loaded, whilst the blade stresses may in any case be kept within very moderate bounds. Another improvement is in the direction of general simplicity in that, in preferred embodiments of the invention, a rotor is provided which has a single row of blading and further the rotor is arranged with great simplicity as regards its bearings and the manner in which it is supported. Ready accessibility and removal can be afforded and the device as proposed is comparatively simple to manufacture and maintain. A further particular object of the invention is to provide a thrust augmenter the suspension of which is convenient from the point of view of aircraft installation, a suspension being contrived so as to meet the expected loads whilst lying within a small compass and being of a nature which enables it to be attached to an aircraft part such as a spar of a wing. The invention includes some features of adaptation of the engine or power unit with which the augmenter is to be associated, and the resultant combination can be designed so that it is readily installed in an aircraft, so that with the power unit it forms a highly effective complete propulsion system.

According to the invention there is provided in a jet-propulsion system a thrust augmenter operating as above described, and comprising a wheel or rotor peripherally carrying axial-flow blading of which the radially inner part is adapted to operate as compressor blading and the outer part as turbine blading. Preferably the blading is constructed in the sense that each compressor blade element has a radial extension comprising a platform or equivalent forming part of a gas-separating band or shroud from which extends radially one or more further blades adapted to operate as turbine blading. In referring to the platforms as forming a band or shroud it is of course intended to convey that they collectively form a band or shroud when the blading is assembled. The invention includes as a further feature the mounting of the augmenter rotor on bearing means supported by a structure which is a cantilever lying wholly on the upstream side of the rotor and surrounded by ducting which is provided to supply the operative fluids to the respective blade annuli. The ducting for the gas to the turbine blading preferably comprises a plurality of symmetrical pipes arranged around the main axis of the installation which all open into a common nozzle chamber and between which are spaces which admit air to the compressor blading.

The invention includes further features for example the provision of a fairing on the downstream side of the rotor coaxial therewith and also supported by the structure upon which the rotor is borne; and a row of stator blading for the compressor may be likewise supported by this structure. Advantageously, provision may be made whereby the rotor may be axially withdrawn for removal, in the downstream direction so that the cantilever structure and fluid ducting may be left undisturbed; and the fairing and stator blading may be removed likewise without disturbance of the upstream structure and preferably along with the rotor.

The accompanying drawings illustrate the invention as adapted to be combined to form a complete augmented power unit with a jet-propulsion gas-turbine aero engine of the type known as the "Whittle" type.

Figure 1:
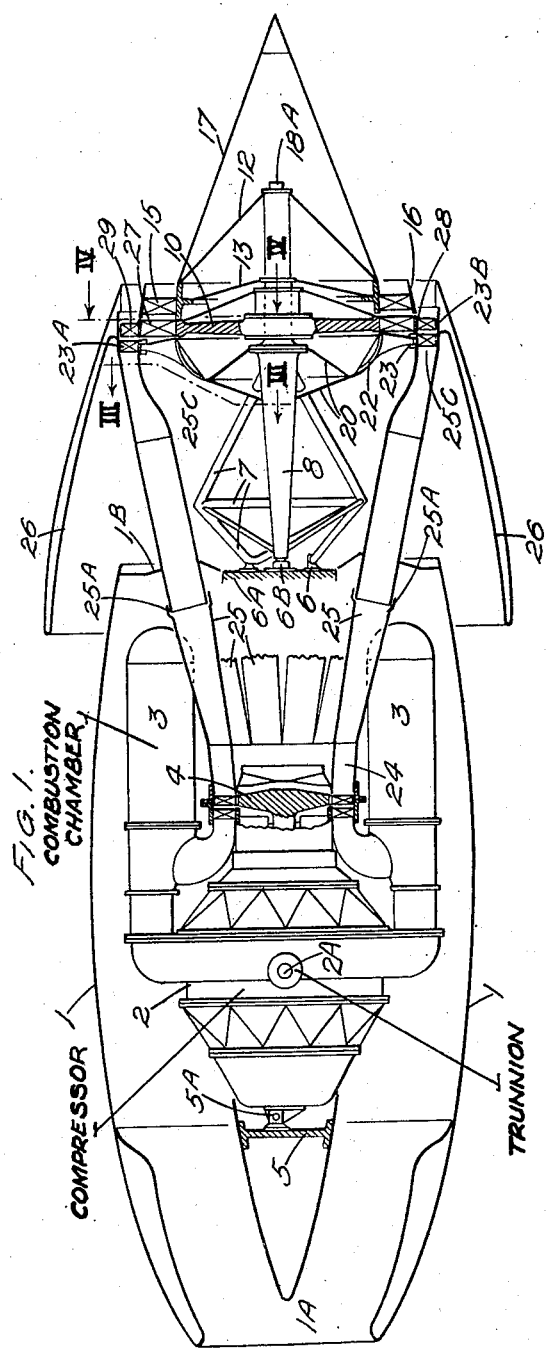
Fig. 1 is a diagrammatic drawing in side elevation, of the power unit in an aircraft nacelle, partly sectioned.
Figure 2:
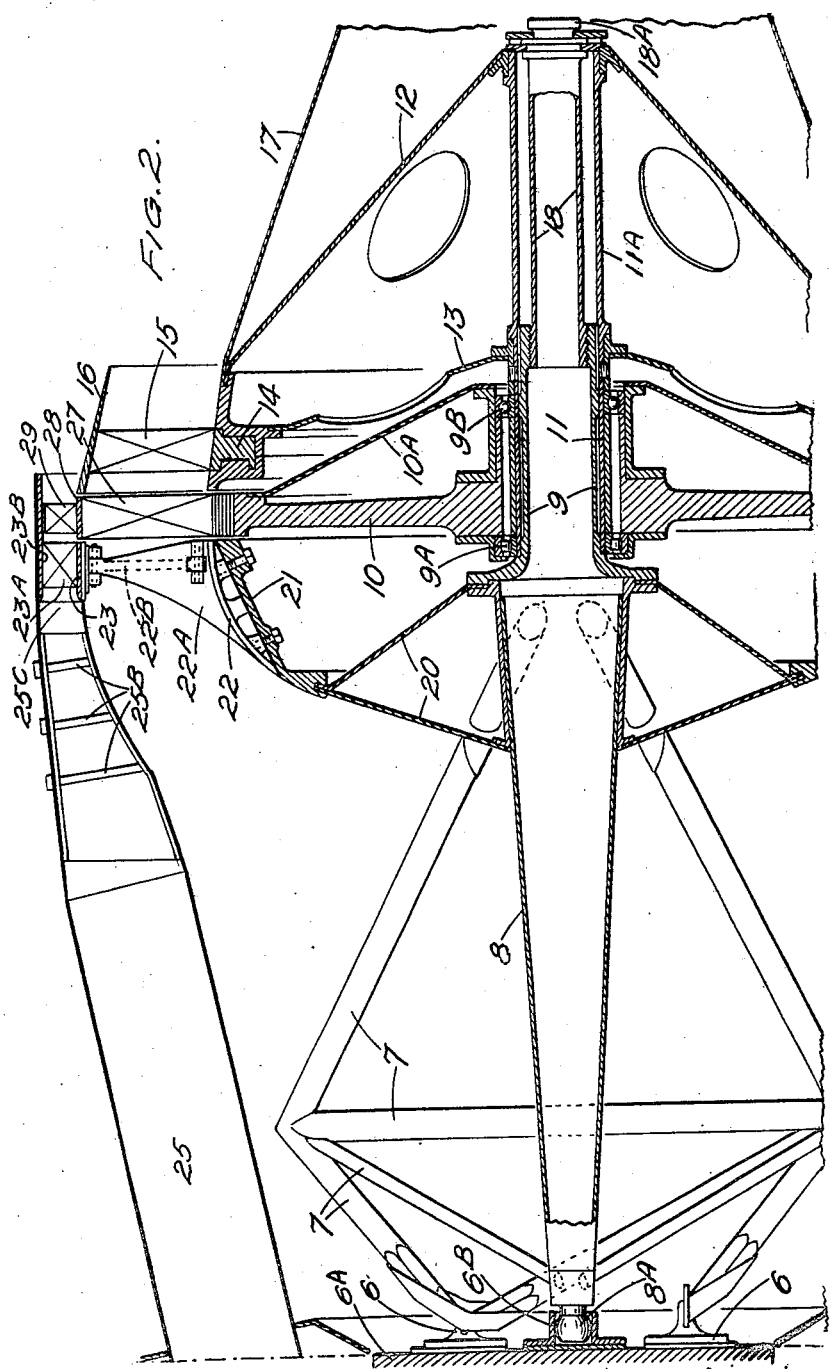
Fig. 2 is an enlarged view of the augmenter arrangement, in sectional side elevation.

An aircraft nacelle is shown at 1 with an air entry opening 1A facing forwardly (in direction of flight) and a reasonably pressure-tight rear bulkhead 1B. In this nacelle 1 is installed the prime mover comprising double-entry centrifugal compressor 2, combustion chambers 3, and gas turbine 4, which drives the compressor. This unit is carried by radial trunnions 2A, there being one trunnion extending radially from either side of the compressor and on its horizontal diameter and engaging a suitable bearing seating in the supportig structure. Tilting of the unit about the diametral trunnion axis is prevented by a locating front support 5A at the front spar 5 of the aircraft wing with which the nacelle is associated. For clarity, the fixed structure carrying the trunnions 2A has been omitted from the drawing. The whole mounting, including the trunnions 2A and the front support 5A, is described in greater detail in Walker et al. U. S. Patent No. 2,481,547, dated September 13, 1949, which has been assigned to the assignees of the present application. A rear spar is indicated at 6A and upon this is mounted the augmenter. A triangulated frame built of members 7 is mounted by brackets 6 to the rear side of the spar 6A and constitutes a cantilever structure tapering towards a point in rear of the structure, where the rear extremities of members 7 are joined (e. g. welded) to an axial tapered tube 8. The forward end of tube 8 has a ball end 8A which is lodged in a socket 6B on the spar 6A. This ball and socket anchorage is given as an example of an anchorage which will prevent radial movement of the forward end of the tube 8 and therefore relieve the joints between the elements 7 and tube 8 of bending loads, while at the same time permitting some freedom for expansions or small deflections of the cantilever as a whole.

The rear end of the tube 8 (which lies coaxial with the power unit and with the augmenter as a whole) supports, through a flange joint, a stationary arbor or axle 9 upon which the augmenter rotor is borne. Upon the axle 9 are mounted roller and ball bearings at 9A, 9B, respectively, and these support the rotor which consists broadly of a disc 10 and a dished or conical stiffening plate 10A forming a rigid whole. On the axle 9 fits a sleeve 11 (which forms a liner between the axle and the bearings) having a rearward extension 11A which forms a support for a conical support element 12 and also mounting a second support element 13 of greater cone angles than the element 12. The skirts of the elements 12, 13, are joined to a built-up ring 14 which is the inner ring of a stator assembly having blading at 15 and outer ring 16. The ring 14 also carries a streamline fairing 17 which lying downstream of and coaxial with the rotor 10, fairs the flow of gases leaving the augmenter. The sleeve 11 and the parts it carries, viz 9A, 9B, 10, 10A, 11A, 12, 13, 14, 15, 16 and 17, are removable as a whole by detaching a single screw element 18 having a head 18A; the element 18 lies within the sleeve 11 and screws into the rear of the axle 9.

The tube 8 also supports two conical or dished parts 20 which form together a stiff structure the skirt of which carries a frustro-conical ring 21 to which are attached a series of pieces 22 which form a fair entry wall for air to the compressor and also comprise arms or brackets 22A which together with links 22B form a ring of lattice structure to carry the turbine nozzle ring assembly, the arms 22A being radial and there being between each pair of arms 22A a link 22B pivotally attached to the radially outer end of one arm 22A and to the radially inner end of the arm adjacent thereto. This assembly consists of an inner ring 23, blading 23A, and outer ring 23B. The parts 22A, 22B, may be of streamline section to avoid losses due to the fairly high velocity air stream passing through the structure which they constitute.

Figure 3:
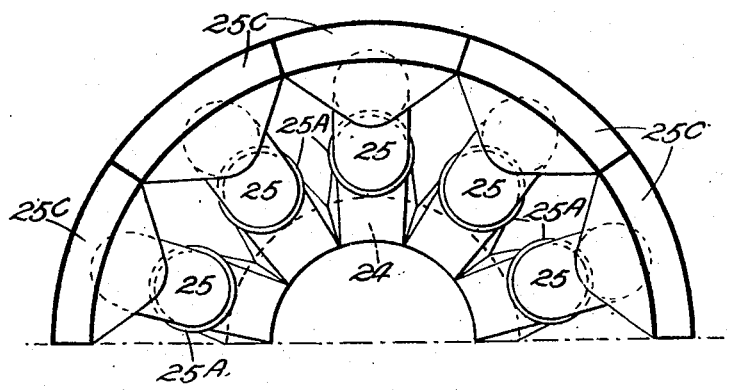
Fig. 3 is a half-section, in axial elevation, on line III—III of Fig. 1.
Figure 4:
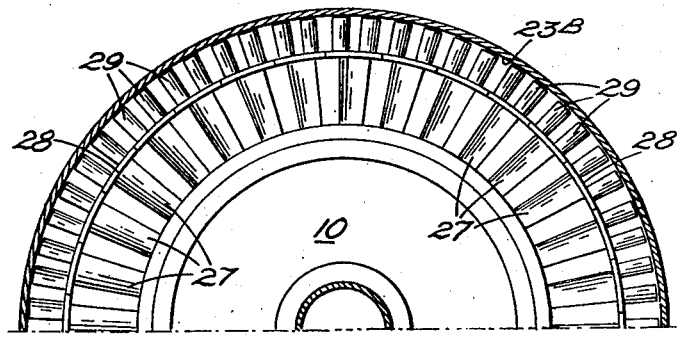
Fig. 4 is a half-section on line IV—IV of Fig. 1.

From the turbine 4 (see Fig. 1) the driving gas is exhausted into an annular chamber 24 of comparatively short axial length, which splits up into a symmetrical circular series of pipes 25 (in the example there are ten such pipes) which are disposed uniformly around the main axis of the power plant. Each pipe 25 has a sliding but gas-tight joint in it at 25A to facilitate assembly and allow for expansion and minor distortion. The rear lengths of the pipes 25 pass through the bulkhead 1B and through apertures provided in the spar 6A where they would otherwise foul. At their rear ends the pipes 25 change section (being braced against the effect of internal pressure, by braces 25B) to form segmental or arcuate outlets at 25C which, when assembled, form a practically continuous annular passage (see Fig. 3) and which outlet into an annular nozzle chamber just upstream of the nozzle ring formed by the blading 23A.

Between the pipes 25 there are spaces, and these admit air for the supply of the compressor. This air is passed into the augmenter by an annular intake scoop 26 the entry of which surrounds the rear of the nacelle 1. The passageway generally constituted by the scoop 26, pipes 25, part 22, and the space between the bulkhead 1B and support 20, is in effect the supply ducting for the compressor, whilst the assembly of the pipes 25 of course constitutes the supply ducting for the turbine.

The compressor and turbine (rotating parts) are constituted by blading carried peripherally on the rotor 10. The compressor blading is shown at 27, consisting of blades attached in any suitable known manner to the rotor disc. Each individual blade 27 has at its tip a platform 28, extending from which is a pair of turbine blades 29. The blades 27 and 29 and the platform 28 are preferably made integral as by casting or machining from one piece, but they may be built up into integral form by welding. The platforms 28, in the assembly, form a virtually continuous band or shroud which, lying in running conditions flush with the inner ring 23 of the nozzle assembly and the outer ring 16 of the air stator assembly, separates the operative fluid streams i. e. the turbine gas and the compressor air.

The turbine and the compressor stator discharge axially to atmosphere and together their leaving streams constitute the desired propulsive jet.

It will be understood that the compressor blading 27 runs comparatively cool, and can therefore better withstand high stresses; it is thus that, in a reasonably light construction, these blades are enabled to carry the turbine blading. In practice, however, it is found possible to design the augmenter with quite modest centrifugal stresses, even so low that the disc 10 is made of light alloy.

Lubrication is provided as may be necessary, following any ordinary suitable practice. Owing to the air flow being inside the gas flow, it is not deemed necessary to make special provision for cooling the rotor disc or neighbouring structure.

We claim:

1. A thrust augmenter comprising a rotor disc, a ring of axial flow compressor blades attached peripherally thereto, a ring of axial flow turbine blades carried radially outwardly by the compressor blades, a turbine entry nozzle ring immediately upstream of said turbine blades, two co-axial annular members located radially within and enveloped by said nozzle ring and immediately upstream of said compressor blades, defining between them an annular air entry thereto and gas ducting leading to said nozzle ring, said ducting being intersected by passages for air flow from the surrounding atmosphere to said air entry.

2. A thrust augmenter comprising a rotor disc, a ring of axial flow compressor blades attached peripherally thereto, a ring of axial flow turbine blades carried radially outwardly by the compressor blades, a turbine entry nozzle ring immediately upstream of said turbine blades, two co-axial annular members located radially within and enveloped by said nozzle ring and immediately upstream of said compressor blades, defining between them an annular air entry thereto, a ring of compressor stator blades immediately downstream of said compressor blades, and gas ducting leading to said nozzle ring, said ducting being intersected by passages for air flow from the surrounding atmosphere to said air entry.

3. A thrust augmenter according to claim 2 wherein a plurality of turbine blades is carried by each compressor blade.

4. A thrust augmenter comprising a rotor disc, a ring of axial flow compressor blades attached peripherally thereto, a ring of axial flow turbine blades carried radially outwardly by the compressor blades, a turbine entry nozzle ring immediately upstream of said turbine blades, two co-axial annular members located radially within and enveloped by said nozzle ring and immediately upstream of said compressor blades, defining between them an annular air entry thereto, and gas ducting leading to said nozzle ring, and consisting of a series of pipes spaced apart to permit air flow therebetween to said air entry.

5. A jet propulsion power plant comprising as a source of motive fluid a gas producing unit having an exhaust duct, a thrust augmenter axially spaced from said unit and comprising a rotor disc, freely rotatable mechanically independently of said unit, a ring of axial flow compressor blades attached peripherally to said disc and a ring of axial flow turbine blades carried radially outwardly by the compressor blades, a turbine entry nozzle ring immediately upstream of said turbine blades, two co-axial annular members located radially within and enveloped by said nozzle ring and immediately upstream of said compressor blades, defining between them an annular air entry thereto, and gas ducting leading from said exhaust duct to said entry nozzle ring, said ducting being intersected by passages to permit air flow from the surrounding atmosphere to said air entry.

6. A jet propulsion power plant including in combination a gas turbine power plant comprising a compressor, combustion system and a turbine and having an exhaust duct, and a thrust augmenter comprising a rotor disc axially spaced from and mounted co-axially with said gas turbine power plant and freely rotatable mechanically independently thereof, a ring of axial flow compressor blades attached peripherally to said disc, a ring of axial flow turbine blades carried radially outwardly by the compressor blades, a turbine entry nozzle ring immediately adjacent to said turbine blades on the side thereof adjacent to the gas turbine power plant, two co-axial annular members located radially within and enveloped by said nozzle ring and immediately upstream of said compressor blades, defining between them an annular air entry thereto, and gas ducting annularly arranged with respect to the axis of the plant and connecting said exhaust duct and said nozzle ring, said ducting being intersected by passages to permit air flow from the surrounding atmosphere to said air entry.

7. A jet propulsion power plant according to claim 6 further comprising a ring of compressor stator blades immediately adjacent to said compressor blades on the side of the rotor disc remote from said gas turbine power plant.

8. A jet propulsion power plant including in combination a gas turbine power plant comprising a compressor, combustion system and a turbine and having an exhaust duct, and a thrust augmenter comprising a rotor disc axially spaced from and mounted co-axially with said gas turbine power plant and freely rotatable mechanically independently thereof, a ring of axial flow compressor blades attached peripherally to said disc, a ring of axial flow turbine blades carried radially outwardly by the compressor blades, a turbine entry nozzle ring immediately adjacent to said turbine blades on the side thereof adjacent to the gas turbine power plant, two co-axial annular members located radially within and enveloped by said nozzle ring and immediately upstream of said compressor blades, defining between them an annular air entry thereto, and gas ducting annularly arranged with respect to the axis of the plant and connecting said exhaust duct and said nozzle ring, said ducting consisting of a series of pipes spaced apart to permit air flow therebetween to said air entry.

RODERICK CRISTALL McLEOD.
KENNETH WATSON.

References Cited in the file of this patent

UNITED STATES PATENTS

| Number | Name | Date |
|---|---|---|
| 1,205,016 | Ramsey | Nov. 14, 1916 |
| 2,391,623 | Heppner | Dec. 25, 1945 |
| 2,405,919 | Whittle | Aug. 13, 1946 |

FOREIGN PATENTS

| Number | Country | Date |
|---|---|---|
| 197,914 | Great Britain | Nov. 1, 1923 |